(12) United States Patent
Hunziker et al.

(10) Patent No.: US 12,059,634 B2
(45) Date of Patent: Aug. 13, 2024

(54) CONTINUOUS MANUFACTURING OF SPRAY-DRIED POWDERS

(71) Applicant: DSM IP ASSETS B.V., Heerlen (NL)

(72) Inventors: André Hunziker, Kaiseraugst (CH); René Lang, Kaiseraugst (CH); David Schaffner, Kaiseraugst (CH); Thomas Zwick, Kaiseraugst (CH)

(73) Assignee: DSM IP ASSETS B.V., Heerlen (NL)

( * ) Notice: Subject to any disclaimer, the term of this patent is extended or adjusted under 35 U.S.C. 154(b) by 843 days.

(21) Appl. No.: 17/048,274

(22) PCT Filed: Apr. 26, 2019

(86) PCT No.: PCT/EP2019/060699
§ 371 (c)(1),
(2) Date: Oct. 16, 2020

(87) PCT Pub. No.: WO2019/207086
PCT Pub. Date: Oct. 31, 2019

(65) Prior Publication Data
US 2021/0101088 A1    Apr. 8, 2021

(30) Foreign Application Priority Data
Apr. 27, 2018 (EP) ...................................... 18169788

(51) Int. Cl.
*A23L 5/44* (2016.01)
*A23L 3/46* (2006.01)
(Continued)

(52) U.S. Cl.
CPC .................. *B01D 1/24* (2013.01); *A23L 3/46* (2013.01); *A23L 5/44* (2016.08); *A23P 10/35* (2016.08);
(Continued)

(58) Field of Classification Search
CPC ... A23L 29/10; A23L 5/44; A23L 5/40; A23L 3/46; A23L 2/58; A23L 29/212;
(Continued)

(56) References Cited

U.S. PATENT DOCUMENTS 7,015,351 B2    3/2006  Haupfear et al.
8,765,186 B2 *  7/2014  Schafer ..................... A23L 5/44
                                                                426/540
(Continued)

FOREIGN PATENT DOCUMENTS

CN    85109641    6/1986
CN    101626695   1/2010
(Continued)

OTHER PUBLICATIONS

CN Application No. 201980027775.9, The First Office Action, Oct. 9, 2022.
(Continued)

*Primary Examiner* — Hong T Yoo
(74) *Attorney, Agent, or Firm* — NIXON & VANDERHYE P.C.

(57) ABSTRACT

The present invention relates to a method of manufacturing spray-dried powders. During the process, a solvent is used. The process is done in a continuous manner and such that the emulsification mass ratio is low when removal of the solvent is started. Preferred solvents are isopropyl acetate and ethyl acetate. The invention also relates to a set-up to run the inventive process at industrial scale.

27 Claims, 8 Drawing Sheets

Figure 1:
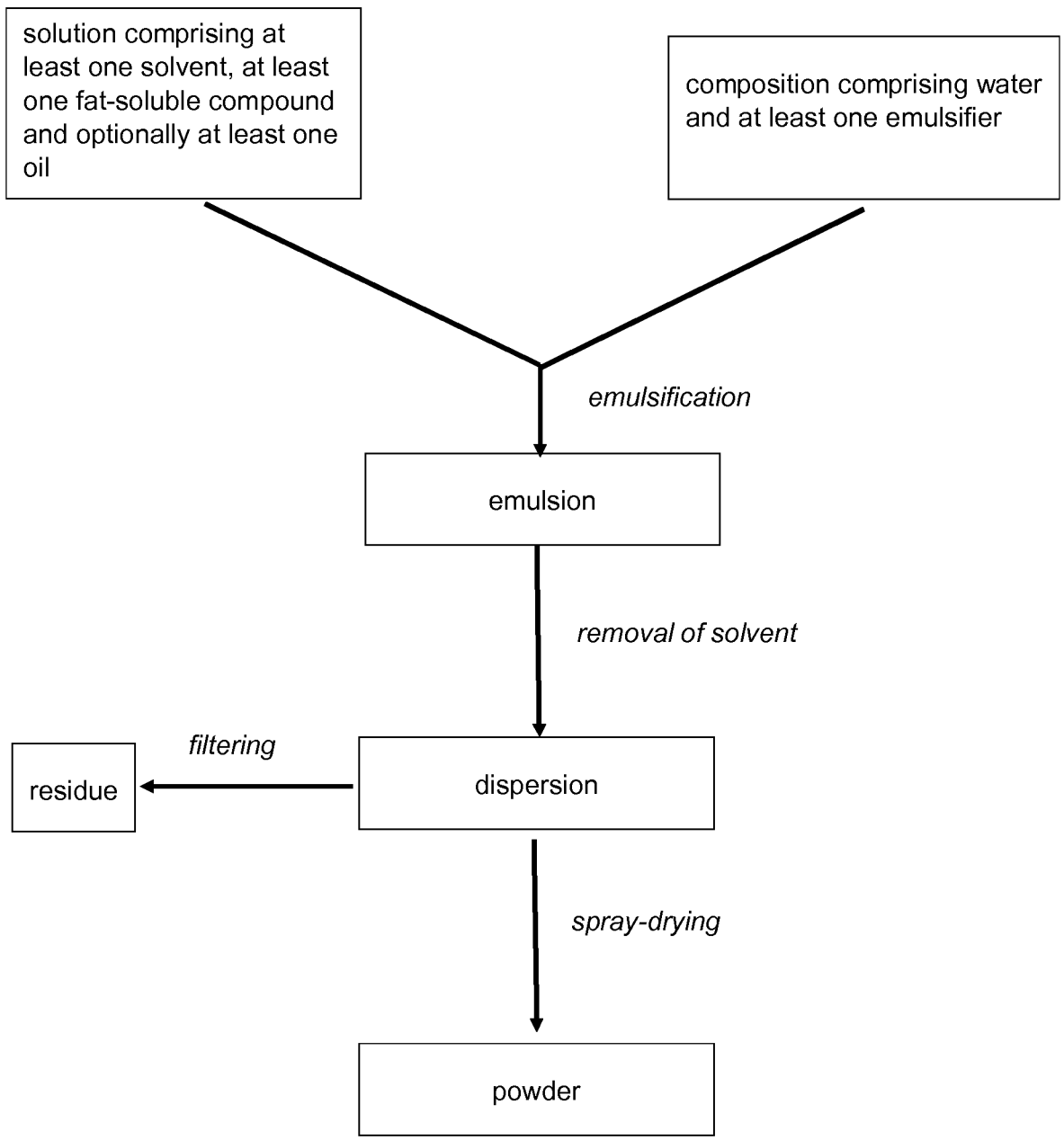

(51) Int. Cl.
*A23P 10/35* (2016.01)
*B01D 1/18* (2006.01)
*B01D 1/24* (2006.01)
*B01F 23/41* (2022.01)
*B01F 35/71* (2022.01)
*C08J 3/12* (2006.01)
*B01F 101/06* (2022.01)

(52) U.S. Cl.
CPC ............... *B01D 1/18* (2013.01); *B01F 23/41* (2022.01); *B01F 35/7176* (2022.01); *B01F 35/71805* (2022.01); *C08J 3/122* (2013.01); *A23V 2002/00* (2013.01); *B01F 2101/06* (2022.01); *C08J 2303/06* (2013.01)

(58) Field of Classification Search
CPC .... A23L 29/284; B01F 23/41; B01F 2101/06; A23V 2250/211; A23P 10/40; A23P 10/30; A23P 10/35
See application file for complete search history.

(56) References Cited

U.S. PATENT DOCUMENTS 10,212,957 B2    2/2019    Qiu et al.
2005/0169999 A1*  8/2005   Eller ................... A61K 9/0095
                                                      514/763
2010/0069510 A1   3/2010   Schafer et al.
2010/0267838 A1  10/2010   Köpsel

FOREIGN PATENT DOCUMENTS

| | | |
|---|---|---|
| CN | 102250141 | 11/2011 |
| CN | 104274428 | 1/2015 |
| EP | 0 178 669 | 4/1986 |
| EP | 0 937 412 | 2/2006 |
| EP | 1 676 851 | 7/2006 |
| EP | 3 020 396 | 5/2016 |

OTHER PUBLICATIONS

International Search Report for PCT/EP2019/060699 mailed Jun. 26, 2019, 4 pages.
Written Opinion of the ISA for PCT/EP2019/060699 mailed Jun. 26, 2019, 13 pages.
De Paz et al., "Formulation of β-carotene by precipitation from pressurized ethyl acetate-on-water emulsions for application as natural colorant", Food Hydrocolloids, Elsevier, vol. 26, No. 1, Feb. 24, 2011, pp. 17-27.

* cited by examiner

CONTINUOUS MANUFACTURING OF SPRAY-DRIED POWDERS

This application is the U.S. national phase of International Application No. PCT/EP2019/060699 filed Apr. 26, 2019 which designated the U.S. and claims priority to EP Patent Application No. 18169788.9 filed Apr. 27, 2018, the entire contents of each of which are hereby incorporated by reference.

TECHNICAL FIELD

The present invention relates to the manufacturing of spray-dried powders which are water-dispersible despite of comprising a fat-soluble compound. A typical fat-soluble compound is beta-carotene. Such powders may be used for the coloration of food and beverages.

BACKGROUND OF THE INVENTION

To color food and beverages, edible colorants are needed. Many edible colorants are fat-soluble. To make fat-soluble colorants water-dispersible, they need to be encapsulated by an edible emulsifier. Well-known edible emulsifiers are gelatin and modified starch.

Water-dispersible powders comprising a fat-soluble compound may be manufactured by spray-drying. To do so, a dispersion which comprises (i) water and (ii) particles is spray-dried. The dispersion's particles have a fat-soluble compound in the core which is surrounded by an edible emulsifier. To be useful in the coloration of food and beverages, the particles must be very small. Typically, the particles have a particle size of less than 1 µm.

Dispersions which are suitable for spray-drying can be manufactured in different manners.

EP 0 937 412 B1 discloses a process for the preparation of a pulverous carotenoid, retinoid or natural colorant preparation, wherein the active ingredient is finely divided, which process comprises the steps of
  a) forming a suspension of the active ingredient in a water-immiscible organic solvent, being dimethyl carbonate, ethyl formate, ethyl or isopropyl acetate, methyl tert. butyl ether or methylene chloride, optionally containing an antioxidant and/or an oil,
  b) feeding the suspension of step a) to a heat exchanger and heating said suspension to 100-180° C., whereby the residence time in the heat exchanger is less than 5 seconds,
  c) rapidly mixing the solution of step b) at a temperature in the range of 20-100° C. with an aqueous solution of a swellable colloid optionally containing a stabilizer,
  d) removing the organic solvent and
  e) converting the dispersion of step d) into a pulverous preparation.

In example 1 of EP 0 937 412 B1, a powder comprising gelatin and having a carotene content of 11.6% was obtained. Whereas such a powder is useful, there is a need for powders on gelatin basis which have a higher carotene content. To get a higher carotene content in the powder, the dispersion which is spray-dried must have a higher carotene content, too.

The problem to be solved by the present invention is the provision of an aqueous dispersion which can be converted into a water-dispersible powder (e.g. by spray-drying) and/or which has a high content of at least one fat-soluble compound such as a fat-soluble colorant.

The manufacturing of such dispersions is a technical challenge. Ideally, the quality of the dispersion is very good such that there is hardly any filter residue when filtering the dispersion over 2 g Hyflo Super Cel® on a filter paper (Whatman 1001-070, Grade 1, median pore size of 7.0 µm).

Thus, a more specific problem to be solved by the present invention is the provision of a process for the industrial manufacturing an aqueous dispersion which:
  has a filtration residue below 4 weight-% of the total weight of the dispersion when filtering the dispersion over 2 g Hyflo Super Cel® on a filter paper (Whatman 1001-070, Grade 1, median pore size of 7.0 µm), and
  can be converted into a water-dispersible powder by spray-drying, and/or
  which has a high content of at least one fat-soluble compound (e.g. a fat-soluble colorant).

SUMMARY OF THE INVENTION

The present invention relates to a powder which contains at least one fat-soluble compound. The powder is preferably water-dispersible and preferably contains high amount of at least one fat-soluble compound.

To manufacture the powder of the invention, an aqueous dispersion is spray-dried. To achieve a high-quality powder, the dispersion to be spray-dried must a have low filter residue when being filtering over 2 g Hyflo Super Cel® on a filter paper (Whatman 1001-070, Grade 1, median pore size of 7.0 µm).

The dispersion to be spray-dried is obtained by removing the solvent of an intermediate composition in an evaporator. Said intermediate composition comprises water and particles,
  wherein said particles have a core and a shell, and
  wherein said shell comprises at least one emulsifier, and
  wherein said core comprises at least one fat-soluble compound and at least one solvent,
    characterized in that the particle-solvent-distribution of the particles in the composition is bimodal.

The emulsifier of the invention is preferably a polymer and even more preferably a colloid such as a hydrocolloid. Most preferably, the emulsifier of the invention is modified starch (such as modified food starch) or gelatin (such as fish gelatin). The most preferred modified food starch is octenylsuccinate starch.

The intermediate composition of the invention may comprise one type of solvent only or a mixture of distinct types of solvents. The purpose of the evaporation step is the removal of the solvent(s) from the particle's core. During the evaporation of the solvent, only a fraction of the dispersion's water, related to the applicable VLE data (vapor liquid equilibrium), is evaporated. Thus, the obtained dispersion is liquid. In the context of the present invention, water is not considered as a solvent.

In a preferred embodiment of the invention, the fat-soluble compound is solid at a temperature of 25° C. An example of such a compound is beta-carotene. When using such compound, the particle's core may further comprise at least one oil, such as vegetable oil. Oil is not removed during the evaporation step and thus, oil is not considered as a solvent.

The present invention also relates to the industrial manufacturing of the dispersion to be spray-dried. For this purpose, a suitable set-up is disclosed. The set-up of the invention comprises an evaporator (1) and a mixing unit (2),
  wherein evaporator (1) has a feed inlet (1a), a vapor outlet (1b) and a liquid outlet (1c), and wherein mixing unit (2) has inlet (2a) and outlet (2b), characterized in that liquid outlet (1c) of evaporator (1), inlet (2a) of mixing unit (2), outlet (2b) of mixing unit (2) and feed inlet (1a) of evaporator (1) are connected to form a loop.

FIGURES

FIG. 1 is a scheme of the process used in the comparative examples. It is a linear process with one evaporation step only. The evaporation step is done to remove the solvent.

Figure 2:
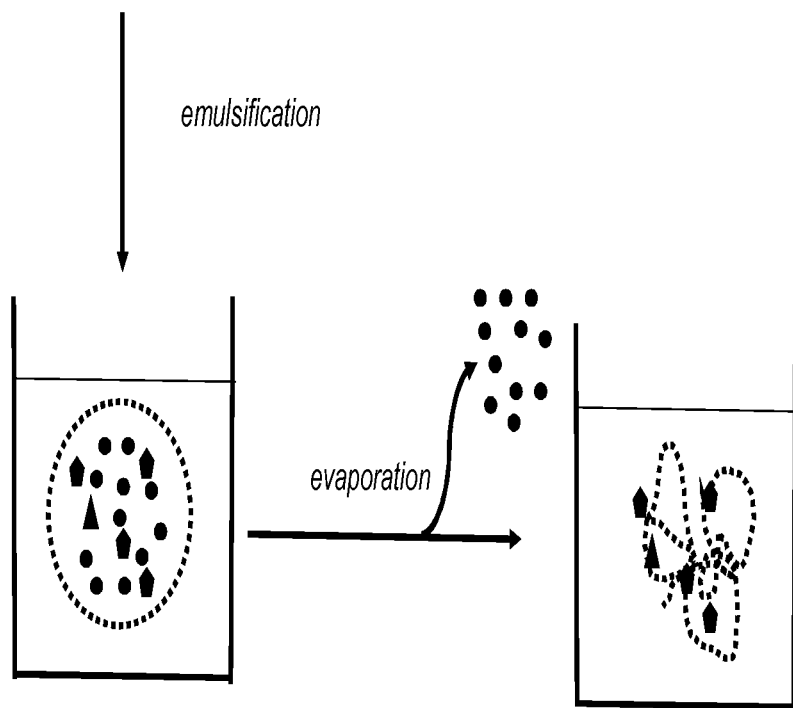

FIG. 2 illustrates the drawback of the process used in the comparative examples: The attempt to increase the amount of fat-soluble compound (which also requires a larger amount of solvent to solve the fat-soluble compound) fails because the particle collapses at the latest during the evaporation step. The particle is shown within an aqueous phase of a liquid composition. Said liquid composition is located in an open container. The fat-soluble compound (pentagon), the oil (triangle) and the solvent (ellipse) are encapsulated by a shell (circle; dashed line). The shell comprises the emulsifier.

Figure 3:
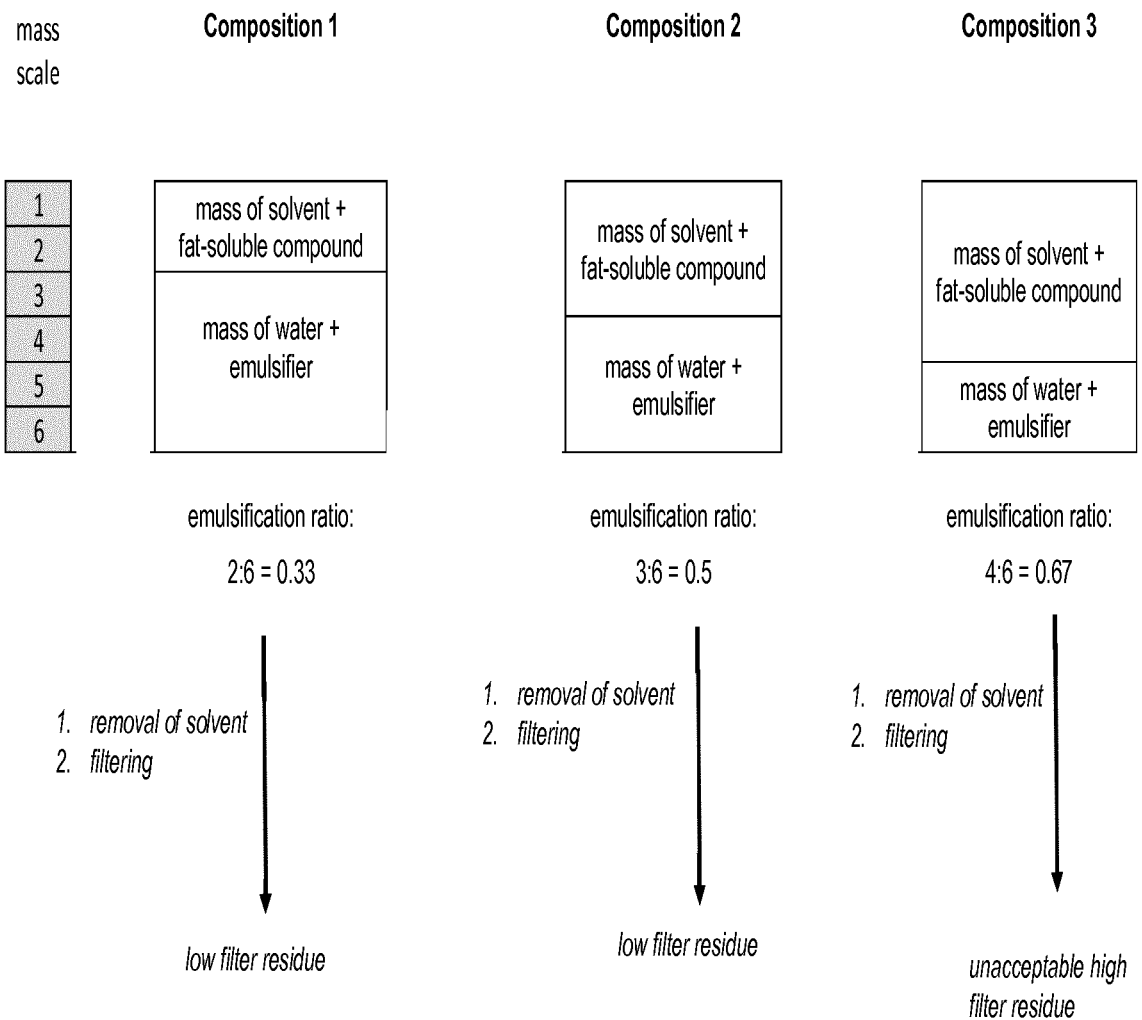

FIG. 3 illustrates the concept of the "critical emulsification mass ratio", using a hypothetical system which has a critical emulsification mass ratio of 0.55. When the relative amount of solvent/fat-soluble compound is increased, the system's critical emulsification mass ratio is eventually exceeded. If the critical emulsification ratio of the system is exceeded, filter residue becomes unacceptable high after removal of the solvent. In the chosen hypothetical system, there is no oil, i.e. the lipophilic compounds are the solvent and the fat-soluble compound. The hydrophilic matrix of the chosen hypothetical system consists of water and emulsifier, i.e. the hydrophilic matrix does not contain further optional compounds.

Figure 4:
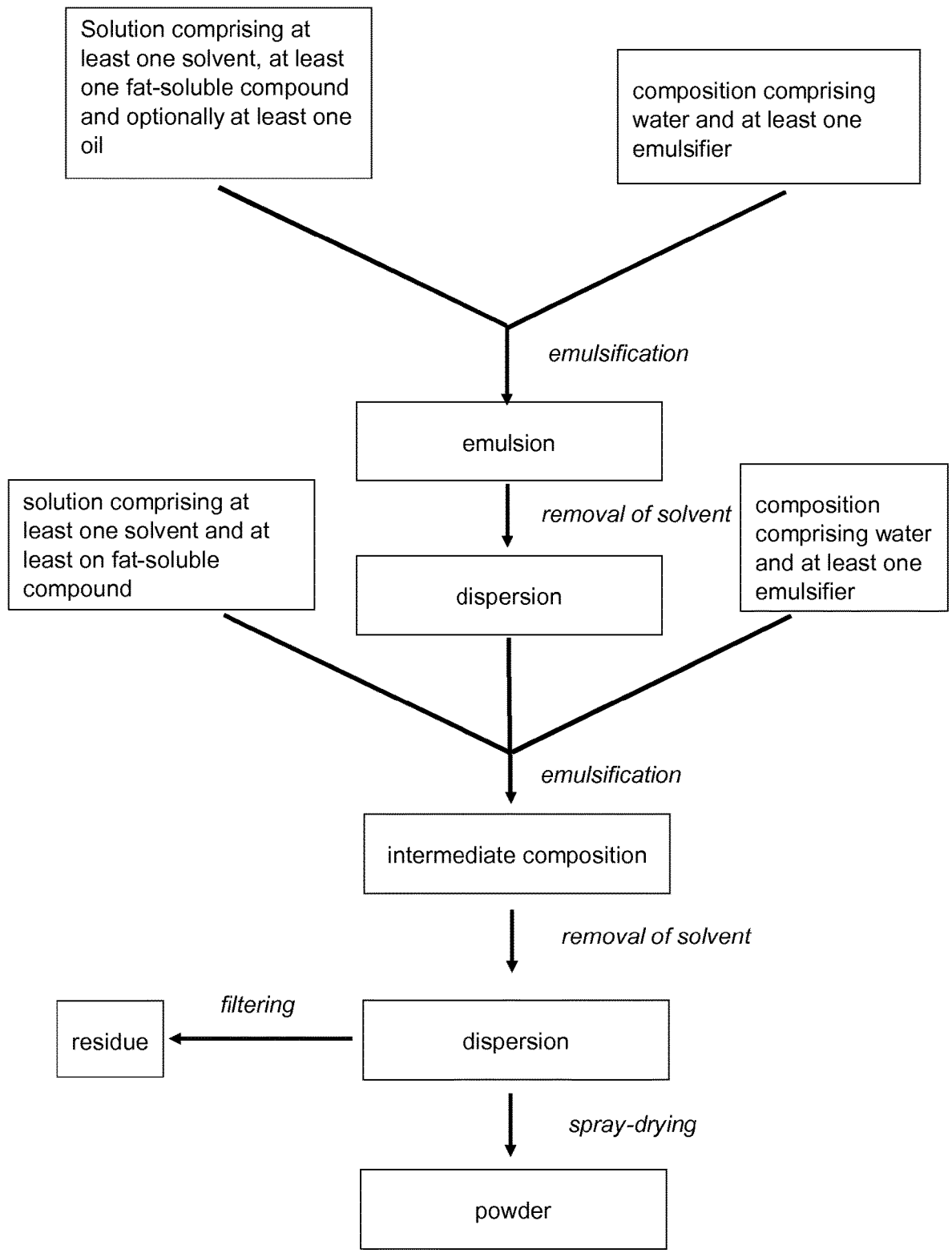

FIG. 4 is a graphical illustration of the general principal underlying the present invention. It illustrates how the filter residue can be kept low even if the system has a high content of fat-soluble compounds. The removal of the solvent is done in more than one step, i.e. there is more than one evaporation step (compare with FIG. 1). Furthermore, an intermediate composition is produced which does not occur in the process shown in FIG. 1.

Figure 5:
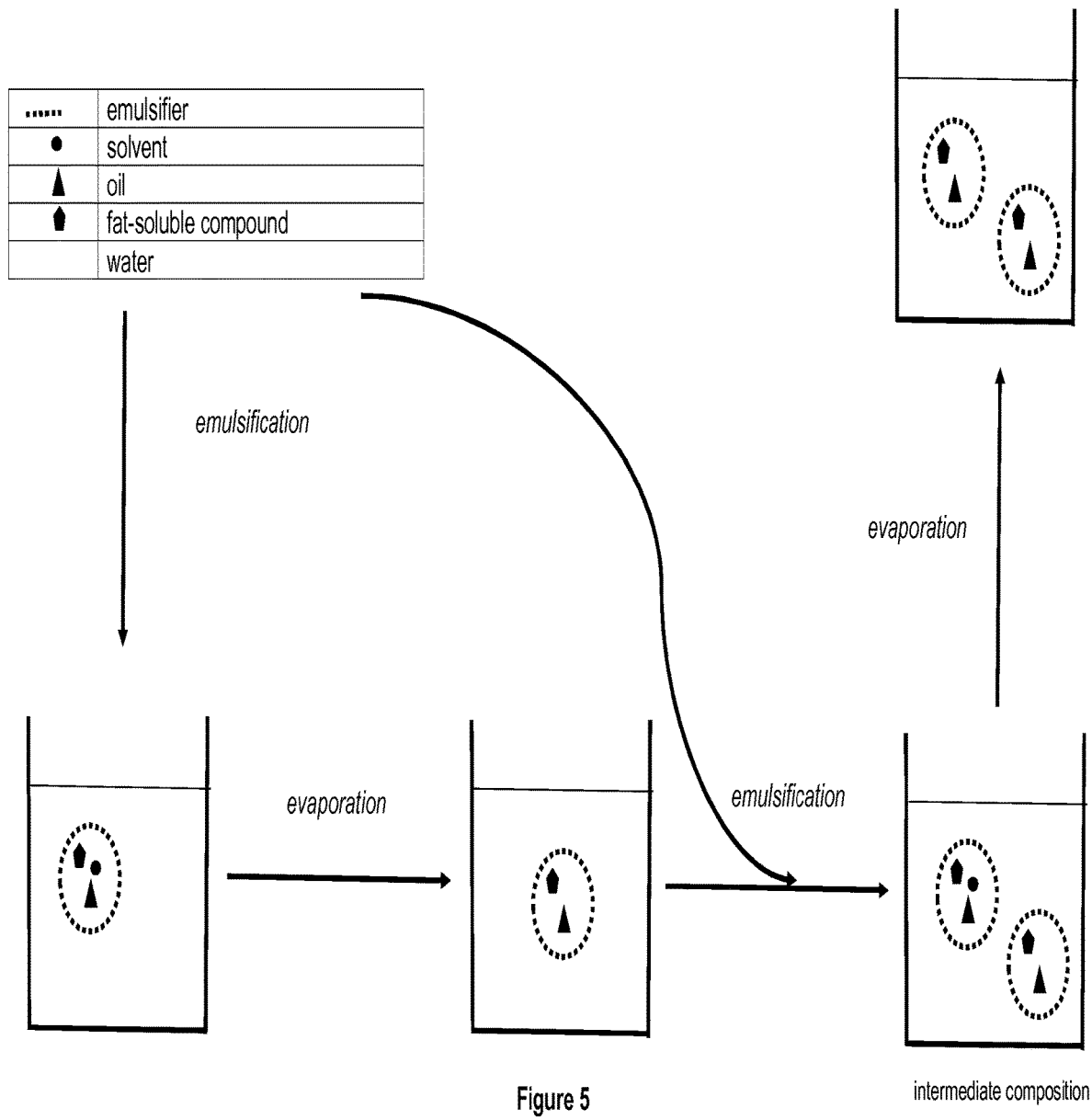

FIG. 5 illustrates why particles do not collapse when using the process of the present invention. In contrast with the process shown in FIG. 2, the formation of particles with a large amount of solvent in the core is avoided when the emulsification step is split into multiple steps that are separated by evaporation steps.

Figure 6:
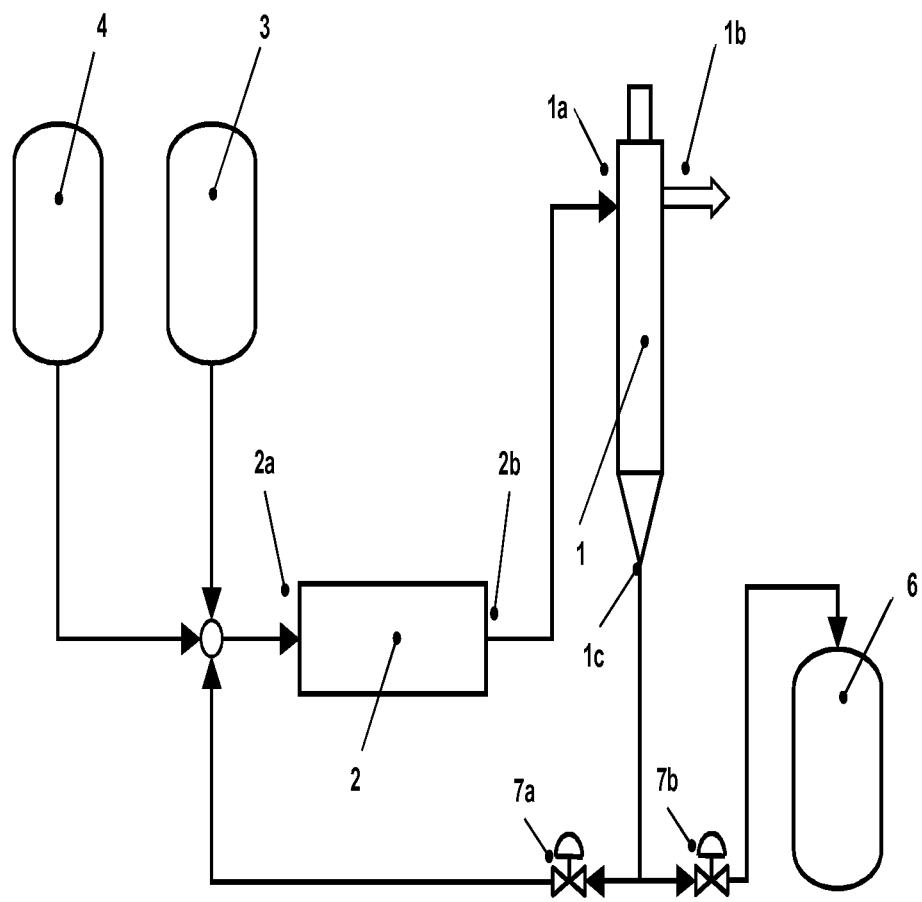
Figure 7:
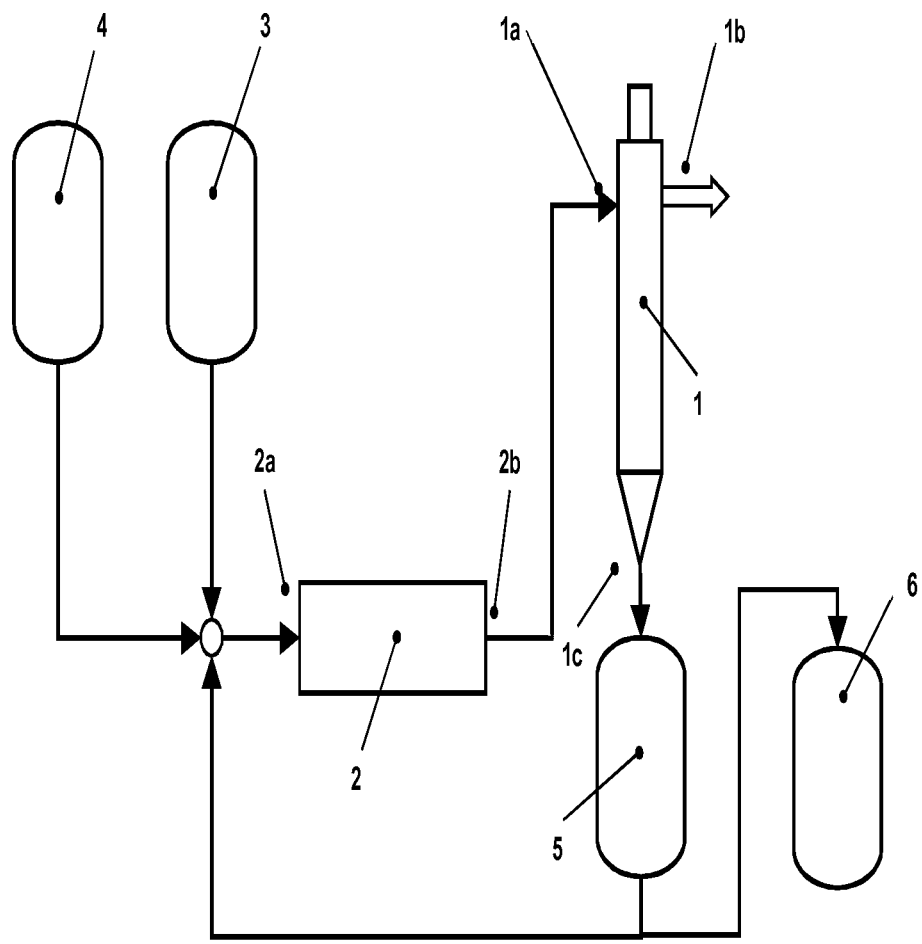

FIGS. 6 and 7 are illustrations of different embodiments of the set-up of the invention. The embodiment shown in FIG. 6 comprises three vessels (vessel (3), vessel (4) and vessel (6)), whereas the more preferred embodiment shown in FIG. 7 comprises in addition vessel (5). In both figures, evaporator (1) has a feed inlet (1a), a vapor outlet (1b) and a liquid outlet (1c). Mixing unit (2) as shown in FIGS. 6 and 7 has inlet (2a) and outlet (2b) and is preferably a homogenizer. Preferably, vessel (6) is connected to an apparatus for spray-drying the content of vessel (6). Said apparatus for spray-drying is preferably a spray-drying tower (not shown in FIGS. 6 and 7).

FIG. 6 shows a set-up wherein components are connected to form a loop. Due to said loop, a liquid composition can be pumped from mixing unit (2) into evaporator (1) and from evaporator (1) back into mixing unit (2). To form said loop, liquid outlet (1c) of evaporator (1) is connected (e.g. by a tube) to inlet (2a) of mixing unit (2), whereas outlet (2b) of mixing unit (2) is connected (e.g. by a tube) to feed inlet (1a) of evaporator (1). In the embodiment shown in FIG. 6, the connection between liquid outlet (1c) of evaporator (1) and inlet (2a) of mixing unit comprises valve (7a). Valve (7a) is preferably a control valve. The embodiment shown in FIG. 6 further comprises vessel (6) and valve (7b). Valve (7b) is preferably also a control valve and is used to divert a fraction of the composition which exits liquid outlet (1c) of evaporator (1) from the loop to vessel (6) in a controlled manner. By way of example, ⅕ of the composition which exits liquid outlet (1c) could be diverted to vessel (6) whereas the remaining ⅘ of said composition could remain in the loop to reach mixing unit (2) through inlet (2a). The composition which leaves the loop (i.e. is diverted to vessel (6)) may be constantly be replaced by what is fed into the loop by vessel (4) and vessel (3).

FIG. 7 shows a preferred embodiment of the invention. Said embodiment could also comprise a control valve (7a) and/or a control valve (7b), even though said valves are not shown in FIG. 7. The embodiment shown in FIG. 7 is similar to the embodiment shown in FIG. 6, i.e. components are also connected to form a loop. However, in the embodiment shown in FIG. 7, the connection between liquid outlet (1c) of evaporator (1) and inlet (2a) of mixing unit comprises an additional vessel (5). Vessel (5) is preferably a holding vessel, which is preferably provided with a pump to control the flow from vessel (5) into mixing unit (2). Typically, vessel (5) is used to make sure that evaporator (1) does not run dry at any moment. For visual monitoring, vessel (5) may have a window (not shown in FIG. 7).

Figure 8:

FIG. 8 illustrates the meaning of "bimodal". When running the process of the invention, a composition inevitably occurs that comprises two types of particles: some particles comprise many solvent molecules in the core (i.e. mode 1) whereas the other particles comprise none or few solvent molecules in the core (mode 2). A mixture of two different unimodal distributions (i.e. distributions having only one mode) give raise to a bimodal distribution.

It is to be understood that the figures are meant for illustrative purposes only. The person skilled in the art understands that reality may be more complex.

Furthermore, it is to be understood that the figures are not limiting the scope of the invention. FIGS. 2 and 5, for example, show systems which include oil. However, oil is an optional component (vide infra). This applies mutatis mutandis to the other features shown in the figures, too.

DETAILED DESCRIPTION OF THE INVENTION

Powders can be obtained e.g. by spray-drying an aqueous dispersion which comprises particles. Other processes to convert aqueous dispersions into a powder are also known.

In the process of the prior art, the dispersion to be spray-dried is obtained by removing solvent from an emulsion (cf. FIG. 1). If the emulsification mass ratio of the emulsion is too high, the dispersion to be spray-dried has poor quality. Poor quality can mean that the obtained spray-dried powder is not fully water-dispersible, i.e. parts of the power float or sediment in an beverage. Therefore, powders comprising a very large amount of at least one fat-soluble compound are difficult or even impossible to manufacture when using the solvent process of the prior art.

In the process of the present invention, the dispersion to be spray-dried is obtained by removing solvent from a specific composition (herein after referred to as "intermediate composition"; cf. FIGS. 4 and 5). Surprisingly, the thus obtained dispersion has excellent quality even if the intermediate composition is highly concentrated. Therefore, it is possible to manufacture powders and/or dispersion that comprise a large amount of at least one fat-soluble compound even if a low-performing solvent such as ethyl acetate or isopropyl acetate is used. Low-performing means that a relatively large amount of the solvent at relatively high temperature is needed for solving fat-soluble colorants such as beta-carotene or lycopene. Advantages of ethyl acetate and isopropyl acetate are lower cost and increased safety and sustainability.

Limitations of the Process of the Prior Art

The process used in the comparative examples is shown in FIGS. 1 and 2. The cores of the emulsion's particles comprise solvent. When the emulsion is heated in an evaporator, the solvent escapes/is removed from the particle's core, i.e. the volume of the core is reduced. Thus, the particles become smaller when the solvent is removed.

The process of the prior art fails when highly concentrated emulsions are used.

While not wishing to be bound by any particular theory or mechanism, it is believed that particles collapse in the emulsification step or in the evaporator when the particle's core comprises too much solvent, i.e. when the inner phase is too large.

Small amounts of solvent can get through the particle's shell as the shell is somewhat flexible: emulsifier molecules forming the core's shell drift temporarily apart to let solvent molecules through. Unfortunately, this mechanism does not work when too many solvent molecules are trying get through the particle's shell at the same moment in time: it makes the particle explode/collapse. The remains of the collapsed particles then agglutinate or agglomerate. As a result, the filter residue increases to an unacceptable high level when the dispersion is filtered after the evaporation step. This postulated mechanism is illustrated in FIG. 2.

Particles collapse in the emulsification step or in the evaporation step when the critical emulsification mass ratio of the chosen system is exceeded. The critical emulsification mass ratio is relatively soon exceeded when using the process of the prior art. This is illustrated in FIG. 3, using a hypothetical exemplary system.

Inventive Concept

The process of the invention is shown in FIG. 4: the emulsification step and the evaporation step are split up in multiple steps. As a result, particles with a large amount of solvent in their core are not formed during the process. Thereof, particles do not collapse in the emulsification or evaporation step. This mechanism is illustrated in FIG. 5: only a part of the lipophilic compounds is emulsified. During emulsification, particles are formed which contain a relatively small amount of solvent in theirs core. Said small amount solvent can be removed by evaporation without making particles collapse. A second part of the lipophilic compounds is then emulsified. Then, solvent from the core of the newly formed particles is removed by evaporation. The old particles are stable enough to survive a second emulsification/evaporation step.

Because particles do not collapse when using the process of the invention, highly concentrated dispersions of fat-soluble compounds with excellent quality can be manufactured. And if a highly concentrated dispersion is spray-dried, a highly concentrated powder is obtained.

The process of the invention is a continuous process which can be run for several days or even weeks without any interruption. To do so, components of the set-up of the invention are connected to form a loop. How this can be done at industrial scale is illustrated in FIGS. 6 and 7. FIG. 7 shows a preferred alternative of the set-up shown in FIG. 6.

Definitions

In the context of the present invention, a "dispersion" may be an emulsion, i.e. the particle's core may be liquid. Alternatively, the dispersion may be a suspension, i.e. the particle's core may be solid. In a typical embodiment of the present invention, however, the particle's core of the dispersion comprises both, liquid and solid compounds.

The "particles" of dispersion are too small to be seen with the naked eye. In a preferred embodiment of the invention, the particles have an average size in the range from 50 to 1000 nm, more preferably from 100 to 800 nm and more preferably from 100 to 500 nm [mean size by cumulant, measured by Photo Correlation Spectroscopy (Beckman Coulter N4 Plus Submicron Particle Sizer)]. "Mean size by cumulant" refers to the z-average, preferably determined according to ISO22412:2008. The particles are water-dispersible despite of having a lipophilic core. This is achieved by surrounding the core with an emulsifier. Said surrounding is referred to as the shell of the particle. The core of the particles may or may not comprise solvent. If it comprises solvent, it may be one solvent only or a mixture of multiple solvents.

The "solvent" of the invention is an organic solvent which has preferably a boiling point of less than 120° C., more preferably less than 100° C. at 1013.25 hPa. Any organic solvent that is mentioned in EP 0 937 412 can be used as long as the chosen fat-soluble compound can be at least partially solved in it. Preferred solvents are water-immiscible or miscible organic solvent such as dimethyl carbonate, ethyl formate, ethyl or isopropyl acetate, methyl tert-butyl ether and methylene chloride, wherein isopropyl acetate and ethyl acetate are particularly preferred. In the context of the present invention, oils are not considered as solvents. Typically, oils have a boiling point of more than 120° C. at 1013.25 hPa. In the context of the present invention, water is not considered as solvent either.

A distribution function for a particular property defines quantitatively how the values of that property are distributed among the particles in the entire population. In the context of the present invention, the relevant property is the number of solvent molecules in the particle's core. Thus, in the context of the present invention, "particle-solvent-distribution" indicates the number of particles present according to the number of solvent molecules in the core.

The particle-solvent-distribution function $P(S)$ is defined by $P(S)$=number of particles in the population having S solvent molecules in the core, wherein the symbol S is a non-negative integer (i.e. $\mathbb{N}_0 = \{0; 1; 2; 3; 4; \ldots\}$). "Bimodal" means that two distinct peaks (local maxima) appear in the smoothed particle-solvent-distribution function $P(S)$ as illustrated in FIG. 8. The person skilled in the art is familiar with "smoothing". Smoothing allows to capture important patterns in the data, while leaving out noise or other fine-scale structures. Thus, as a rough approximation, bimodal means that there are two types of particles: some particles comprise many solvent molecules in the core whereas the other particles comprise none or few solvent molecules in the core.

The "intermediate composition" of the invention is a composition, comprising water and particles,
 wherein said particles have a core and a shell, and
 wherein said shell comprises at least one emulsifier, and wherein said core comprises at least one fat-soluble compound and at least one solvent,
characterized in that the particle-solvent-distribution of the particles in the composition is bimodal.

Thus, roughly speaking, the intermediate composition comprises two types of particles, wherein the two types of particles differ from one another by the amount of solvent in the core. In a preferred embodiment of the invention, the core of one type of particles of the intermediate composition are essentially free of solvent whereas the core of the other type of particles of the intermediate composition contain a significant number of solvent molecules. The expression "core being essentially free of solvent" refers to a particle that comprises less than 10'000 ppm, preferably less than 100 ppm and most preferably less than 10 ppm solvent molecules in its core (ppm=mol fraction). The expression "significant number of solvent molecules" refers preferably to at least 5% solvent molecules, more preferably to at least 40% solvent molecules and most preferably to at least 85% solvent molecules, based on the total number of molecules in the core of the particle.

Fat-soluble compounds are understood to have a solubility in water of less than 5 g fat-soluble compound/L water at 20° C., preferably of less than 2 g fat-soluble compound/L water at 20° C., and most preferably of less than 1 g fat-soluble compound/L water at 20° C. Preferred "fat-soluble compounds" are fat-soluble colorants or fat-soluble micronutrients such as fat-soluble vitamins and fatty acids. In a more preferred embodiment of the invention, fat-soluble compounds are carotenoids, retinoids and natural colorants being mentioned in paragraph [0015] of EP 0 937 412 B1. In an even more preferred embodiment of the invention, fat-soluble compounds are beta-carotene, lycopene, beta-apo-4'-carotenal, beta-apo-8'-carotenal, beta-apo-12'-carotenal, beta-apo-8'-carotenic acid, astaxanthin, canthaxanthin, zeaxanthin cryptoxanthin, citranaxanthin, lutein, torularodin-aldehyde, torularodin-ethylester, neurosporaxanthin-ethylester, zeta-carotene or dehydroplectaniaxanthin. In the most preferred embodiment of the invention, fat-soluble compounds are beta-carotene or lycopene.

Thus, one embodiment of the invention relates to a composition, comprising water and particles,
wherein said particles have a core and a shell, and
wherein said shell comprises at least one emulsifier, and
wherein said core comprises at least one fat-soluble compound and solvent, characterized in that the particle-solvent-distribution of the particles in the composition is bimodal, and
characterized in that said at least one fat-soluble compound is a carotenoid, retinoid and/or a colorant and/or is preferably beta-carotene, lycopene, beta-apo-4'-carotenal, beta-apo-8'-carotenal, beta-apo-12'-carotenal, beta-apo-8'-carotenic acid, astaxanthin, canthaxanthin, zeaxanthin cryptoxanthin, citranaxanthin, lutein, torularodin-aldehyde, torularodin-ethylester, neurosporaxanthin-ethylester, zeta-carotene, dehydroplectaniaxanthin, bixin, saffron, crocin, capsanthin, capsorubin, rubixanthin, violaxanthin and/or rhodoxanthin, a metal chelate of carminic acid, curcumin and/or chlorophyllin.

In the context of the present invention, the term "lipophilic compounds" refers to (a) the at least one fat-soluble compound, (b) the solvent(s) and (c) the optionally oil. The lipophilic compounds are supplied by vessel (4) of the set-up of the invention (vide infra). The term "hydrophilic matrix" refers to (1) the water, (2) the at least one emulsifier and (3) to further water-soluble compounds which are optionally present such as sugar.

In the context of the present invention, the "emulsification mass ratio" relates to a composition comprising (i) lipophilic compounds (=fat-soluble compounds, solvent and optionally oil) and (ii) hydrophilic matrix and is calculated as follows:

$$\frac{\text{total mass of all lipophilic compounds}}{\text{total mass of the composition}}$$

Alternatively, the emulsification mass ratio can be expressed in percentages:

$$\frac{\text{total mass of all lipophilic compounds} * 100}{\text{total mass of the composition}}$$

When filtering the dispersion after removal of the solvent (and partial removal of the water, depending on the applicable vapor liquid equilibrium), the filter residue increases dramatically if the relative amount of the lipophilic compounds in the respective dispersion exceeds a certain threshold. In the context of the present invention, this threshold is referred to as "critical emulsification mass ratio" (cf. FIG. 3 for a hypothetical example). The value of a system's critical emulsification mass ratio depends on the chosen solvent, fat-soluble compound and emulsifier. For systems comprising ethyl acetate or isopropyl acetate, it is lower than for a corresponding system comprising a high-performing solvent such as methylene chloride.

Any of the colloids mentioned in paragraph [0021] of EP 0 937 412 B1 can be used as emulsifier. However, preferred emulsifiers of the invention are modified starch and gelatin. A particularly preferred modified starch is octenyl-succinate starch ("OSA starch"), preferably as defined in WO 2013/144221. OSA starch is commercially available e.g. under the brand HiCap® or Capsula Less preferred emulsifiers are colloids such as xanthan gum, gum arabic, guar gum, locust bean gum, carboxymethyl cellulose and alginate.

A "set-up" is a way in which things are arranged. In a preferred embodiment of the invention, the set-up is an apparatus having multiple components. Said apparatus may be part of a plant which comprises additional equipment such as a spray-drying tower.

Some of the components of the set-up of the invention are connected to form a loop. In the context of the invention, "loop" means that the respective components are arranged such that a liquid composition can be pumped in cycles. However, the term loop does not mean that nothing can be added. In contrast, one or several liquid compositions may be added (e.g. by vessel (4) and/or by vessel (3) in FIGS. 6 and 7) to what is being pumped in cycles. Similarly, a fraction what is being pumped in cycles can preferably continuously be removed (e.g. can be diverted to a vessel which is not part of the loop; cf. vessel (6) in FIGS. 6 and 7).

In the context of the present invention, the expressions "weight" of a composition and "mass" of a composition are used interchangeably.

Method of Manufacturing the Dispersion

The method used in the comparative examples is shown in FIG. 1. It is a linear process, i.e. everything is emulsified in one step before removal of the solvent. In this process, the mass ratio of the two compositions must be chosen such that the critical emulsification mass ratio is not exceeded (cf. hypothetical example of FIG. 3).

In contrast, the method of the invention is an iterative process: the solution comprising the solvent and the at least one fat-soluble compound is added stepwise and thus, the critical emulsification mass ratio of the system is never exceeded. In between the steps, the solvent is removed by evaporation. When the solvent is removed in an evaporator (preferably at a pressure of less than 1500 mbar, preferably at a pressure of less than 1000 mbar), a small amount of water (e.g. less than 1 weight-% of the composition's water) also evaporates. The complete removal of the solvent is desired but not absolutely be necessary, i.e. it might be sufficient to remove 95%, preferably 98% and most preferably 99% of the solvent molecules that are contained in the respective composition. The thus obtained composition might contain 1000-15000 ppm or less solvent. To further reduce the amount of solvent (e.g. to a residual solvent level of below 10 ppm), an additional evaporation step can be applied (not shown in the figures).

The general principle of the present invention is shown in FIG. 4. Thus, the present invention relates to a process for the preparation of a powder comprising at least one fat-soluble compound, wherein the process comprises the steps of
a) providing a solution comprising at least one fat-soluble compound, at least one solvent and optionally at least one oil,
b) providing a composition comprising water and at least one emulsifier
c) rapidly mixing a fraction of the solution of step a) at a temperature in the range of 20-100° C. with a fraction of the solution of step b),
d) removing the solvent by heating the composition of step c)
e) adding additional fractions of compositions of step a) and optionally of step b) to the composition of step d) under vigorous stirring,
f) removing the solvent, preferably by heating the composition of step e) at a pressure of less than 1500 mbar
g) converting the dispersion of step f) into powder.

In step e) of this process, the intermediate composition of the invention is obtained.

Thus, the present invention also relates to a process comprising the following steps:
a) providing a composition comprising water and particles, wherein said particles have a core and a shell, and wherein said shell comprises at least one emulsifier, and wherein said core comprises at least one fat-soluble compound and at least one solvent, characterized in that the particle-solvent-distribution of the particles in the composition is bimodal
b) removing said at least one solvent at least partially, preferably by heating the composition of step a) at a pressure of preferably less than 1500 mbar
c) optionally converting the dispersion of step b) into a powder.

In a preferred embodiment of the invention, the intermediate composition of the invention comprises water and particles,
wherein said particles have a core and a shell, and
wherein said shell comprises at least one modified starch and/or or at least one gelatin, and
wherein said core comprises at least one colorant, at least one solvent and optionally at least one edible oil, and
wherein said at least one colorant is preferably beta-carotene and/or lycopene, and wherein said at least one solvent is preferably ethyl acetate and/or isopropyl acetate, and wherein said at least one edible oil is preferably corn oil,
characterized in that the particle-solvent-distribution of the particles in the composition is bimodal.

Thus, a preferred embodiment of the invention relates to a process comprising the steps:
a) providing a composition comprising water and particles, wherein said particles have a core and a shell, and wherein said shell comprises at least one modified starch and/or at least one gelatin, and wherein said core comprises at least one colorant, at least one solvent and optionally at least one edible oil, and wherein said at least one colorant is preferably beta-carotene and/or lycopene, and wherein said at least one solvent is preferably ethyl acetate and/or isopropyl acetate, and wherein said at least one edible oil is preferably corn oil, and characterized in that the particle-solvent-distribution of the particles in the composition is bimodal,
b) removing the organic solvent at least partially, preferably by heating the composition of step a), and
c) optionally converting the dispersion of step b) into a powder.

The intermediate composition may have a relatively high emulsification ratio because a fraction of the fat-soluble compound and the optional at least one oil is enclosed in particles which are already free of solvent. In a preferred embodiment of the invention at least 10%, preferably at least 20% and most preferably at least 30% of the intermediate composition's particles have a core which is essentially free of solvent.

The value of the acceptable emulsification ratio of the intermediate composition depends on the chosen system. Below list gives an overview of preferred embodiments of the invention's intermediate composition:

| Intermediate composition comprising . . . | | | |
|---|---|---|---|
| | . . . and particles, wherein said particles have . . . and . . . | | |
| . . . water | . . . a core comprising | . . . a shell comprising | emulsification ratio of the intermediate composition |
| | beta-carotene, edible oil and ethyl acetate | at least one modified starch | from 5% to 25%, preferably from 5% to 20% and most preferably from 5% to 15% |
| | beta-carotene, edible oil and ethyl acetate | at least one gelatin | from 5% to 60%, preferably from 5% to 50% and most preferably from 5% to 40% |
| | beta-carotene, edible oil and isopropyl acetate | at least one modified starch | from 5% to 55%, preferably from 5% to 50% and most preferably from 5% to 40% |
| | beta-carotene, edible oil and isopropyl acetate | at least one gelatin | from 5% to 60%, preferably from 5% to 55% and most preferably from 5% to 45% |
| | lycopene, edible oil and ethyl acetate | at least one modified starch | from 5% to 40%, preferably from 5% to 30% and most preferably from 5% to 20% |
| | lycopene, edible oil and ethyl acetate | at least one gelatin | from 5% to 60%, preferably from 5% to 50% and most preferably from 5% to 40% |
| | lycopene, edible oil and ethyl acetate | at least one modified starch | from 5% to 60%, preferably from 5% to 50% and most preferably from 5% to 40% |
| | lycopene, edible oil and isopropyl acetate | at least one gelatin | from 5% to 35%, preferably from 5% to 30% and most preferably from 5% to 25% |

Spray-Dried Powder

The spray-dried powder of the invention is water-dispersible and comprises a high content of at least one fat-soluble compound. "High" means that the same content of the same fat-soluble compound cannot be achieved for the same system/solvent when the manufacturing process of the prior art is used. The exact value of "high" depends on the chosen system/solvent. Highest content can be achieved if methylene chloride is used as solvent and/or if gelatine is used as emulsifier, provided the manufacturing process of the invention is used. Below list gives an overview of preferred embodiments of the invention's spray-dried powder. In these preferred embodiments, a colloid is used as emulsifier, wherein OSA-starch is the preferred modified starch and wherein fish gelatin is the preferred gelatin:

| Powder # | Fat-soluble compound | oil (yes/no) | emulsifier | amount of fat-soluble compound, based on the total weight of the spray-dried composition |
|---|---|---|---|---|
| 1 | beta-carotene | yes | at least one modified starch | at least 10 weight-%, preferably at least 20 weight-% |
| 2 | beta-carotene | yes | at least one gelatin | at least 15 weight-%, preferably at least 35 weight-% |
| 3 | lycopene | no | at least one modified starch | at least 15 weight-%, preferably at least 25 weight-% |
| 4 | lycopene | no | at least one gelatin | at least 15 weight-%, preferably at least 40 weight-% |

Set-Up

The present invention also relates to a set-up, i.e. to a way in which things are arranged.

When using the process of the invention, the set-up of the invention is preferably used. Although the process of the invention requires at least two evaporation steps and at least two emulsification steps, the set-up of the invention may have one evaporator only and one mixing unit only (cf. FIGS. 6 and 7). The set-up of the invention allows to run the process of the invention in circular manner and thus, more than one evaporation step and more than one emulsification step can be done despite there might be one evaporator only and one mixing unit only.

The set-up of the invention is used for encapsulating fat-soluble compounds with at least one emulsifier, wherein said at least one emulsifier is preferably a colloid. By encapsulating a fat-soluble compound, the fat-soluble compound becomes water-dispersible. Once encapsulation is done, spray-drying may begin. Thus, the set-up of the invention may optionally also comprise at least one apparatus for spray-drying (not shown in the figures).

The set-up of the invention comprises evaporator (1) and mixing unit (2),
wherein evaporator (1) has a feed inlet (1a), a vapor outlet (1b) and a liquid outlet (1c), and
wherein mixing unit (2) has inlet (2a) and outlet (2b),
characterized in that liquid outlet (1c) of evaporator (1), inlet (2a) of mixing unit (2), outlet (2b) of mixing unit (2) and feed inlet (1a) of evaporator (1) are connected to form a loop.

In a preferred embodiment, the set-up of the invention comprises evaporator (1) and mixing unit (2),
wherein evaporator (1) has a feed inlet (1a), a vapor outlet (1b) and a liquid outlet (1c), and
wherein mixing unit (2) has inlet (2a) and outlet (2b),
characterized in that in that liquid outlet (1c) of evaporator (1) is connected to inlet (2a) of mixing unit (2), and characterized in that outlet (2b) of mixing unit (2) is connected to feed inlet (1a) of evaporator (1) such that a liquid composition can be pumped from mixing unit (2) into evaporator (1) and from evaporator (1) back into mixing unit (2).

The set-up of the invention may be used for running a process in a continuous manner. When doing so, it should be made sure that evaporator (1) never runs dry. This can be done by controlling the flow rate. To do so, one or more control valve can be integrated in the loop.

Thus, one embodiment of the invention relates to a set-up which comprises evaporator (1), mixing unit (2) and valve (7a),
wherein evaporator (1) has a feed inlet (1a), a vapor outlet (1b) and a liquid outlet (1c), and
wherein mixing unit (2) has inlet (2a) and outlet (2b),
characterized in that in that liquid outlet (1c) of evaporator (1) is connected to inlet (2a) of mixing unit (2), and characterized in that outlet (2b) of mixing unit (2) is connected to feed inlet (1a) of evaporator (1) such that a liquid composition can be pumped from mixing unit (2) into evaporator (1) and from evaporator (1) back into mixing unit (2), and
characterized in that the connection between liquid outlet (1c) of evaporator (1) and inlet (2a) of mixing unit comprises valve (7a), wherein said valve (7a) is preferably a control valve.

In addition to valve (7a) or instead of valve (7a), the set-up of the invention preferably comprises vessel (5). Such embodiment is show in FIG. 7. Said vessel (5) is preferably a holding vessel having optionally at least one window for visual inspection.

Thus, one embodiment of the invention relates to a set-up which comprises evaporator (1), mixing unit (2) and vessel (5),
wherein evaporator (1) has a feed inlet (1a), a vapor outlet (1b) and a liquid outlet (1c), and
wherein mixing unit (2) has inlet (2a) and outlet (2b),
characterized in that in that liquid outlet (1c) of evaporator (1) is connected to inlet (2a) of mixing unit (2), and characterized in that outlet (2b) of mixing unit (2) is connected to feed inlet (1a) of evaporator (1) such that a liquid composition can be pumped from mixing unit (2) into evaporator (1) and from evaporator (1) back into mixing unit (2), and
characterized in that the connection between liquid outlet (1c) of evaporator (1) and inlet (2a) of mixing unit comprises vessel (5), wherein said vessel (5) is preferably a holding vessel and wherein vessel (5) is preferably provided with a pump to control the flow from vessel (5) into mixing unit (2).

The set-up of the invention is arranged such that a liquid composition can be pumped in cycles. During a continuous manufacturing process, compositions are added to and/or are removed from what is pumped in cycles. Typically, the amount that is removed corresponds to the amount that is added such that evaporator (1) does not run dry. In a preferred embodiment of the invention, the set-up comprises at least two additional vessels to add what is pumped in cycles two non-identical compositions. Thus, one embodiment of the invention relates to a set-up of the invention which comprises evaporator (1), mixing unit (2), vessel (3) and vessel (4), wherein evaporator (1) has a feed inlet (1a), a vapor outlet (1b) and a liquid outlet (1c), and wherein mixing unit (2) has inlet (2a) and outlet (2b), characterized in that liquid outlet (1c) of evaporator (1), inlet (2a) of mixing unit (2), outlet (2b) of mixing unit (2) and feed inlet (1a) of evaporator (1) are connected to form a loop, and wherein vessel (3) and vessel (4) are arranged such that two non-identical compositions can be fed into the loop formed by liquid outlet (1c), inlet (2a), outlet (2b) and feed inlet (1a), and/or wherein vessel (3) and vessel (4) are preferably connected to mixing unit (2) such that mixing unit (2) can be fed through inlet (2a) with the composition of vessel (3), the composition of vessel (4) and the composition exiting liquid outlet (1c) of evaporator (1).

To remove a composition from what is pumped in cycles, the set-up of the invention comprises preferably a further vessel and a optionally a further control valve. Thus, one embodiment of the invention relates to a set-up of the invention which comprises evaporator (1), mixing unit (2), vessel (3), vessel (4) and vessel (6), wherein evaporator (1) has a feed inlet (1a), a vapor outlet (1b) and a liquid outlet (1c), and wherein mixing unit (2) has inlet (2a) and outlet (2b), characterized in that liquid outlet (1c) of evaporator (1), inlet (2a) of mixing unit (2), outlet (2b) of mixing unit (2) and feed inlet (1a) of evaporator (1) are connected to form a loop, and wherein vessel (3) and vessel (4) are arranged such that two non-identical compositions can be fed into the loop formed by liquid outlet (1c), inlet (2a), outlet (2b) and feed inlet (1a), and wherein vessel (3) and vessel (4) are preferably connected to mixing unit (2) such that mixing unit (2) can be fed through inlet (2a) with the composition of vessel (3), the composition of vessel (4) and the composition exiting liquid outlet (1c) of evaporator (1), and wherein vessel (6) is arranged such that a fraction of the composition exiting liquid outlet (1c) of evaporator (1) can be diverted from said loop to vessel (6), and wherein the set-up preferably further comprises valve (7b) to control the amount of the composition exiting liquid outlet (1c) of evaporator (1) that is diverted to vessel (6), wherein said valve (7b) is preferably a control valve.

Preferably, the set-up of the invention is suitable to manufacture powder at industrial scale, i.e. to manufacture large quantities of powder. Therefore, vessel (3), vessel (4), vessel (5) and/or vessel (6) is preferably capable of holding a volume of at least 100 liters, more preferably of at least 500 liters and most preferably of at least 3000 liters.

In the above described embodiments, mixing unit (2) is suitable for manufacturing an emulsion. To do so, high shear forces are required. Thus, mixing unit (2) is preferably a homogenizer device such as a high-pressure homogenizer (e.g. with a pressure drop of at least 50 bar, preferably with a pressure drop from 100 bar to 500 bar and/or an orifice with a diameter of less than 1000 μm, preferably less than 500 μm and most preferably less than 300 μm), a colloid mill, a nozzle (e.g. with a nozzle diameter from 0.1 mm to 0.5 mm, preferably from 0.2 mm to 0.3 mm), a rotor-stator homogenizer (e.g. allowing a rotor speed of at least 3000 rpm, preferably of at least 4000 rpm and most preferably of at least 5000 rpm; rpm=revolutions per minute) or a combination of the mentioned equipment.

In the above described embodiments, evaporator (1) may be a vertical evaporator, a film evaporator, a flash vessel or any other kind of evaporator that can be used to remove an organic solvent. In a preferred embodiment, evaporator (1) is a film evaporator. Most preferably, evaporator (1) is a wiped fine film evaporator.

In a less preferred embodiment of the invention, the set-up of the invention also comprises an apparatus for spray-drying. Said apparatus might also be connected to liquid outlet (1c) of evaporator (1). In such embodiment, a switch or valve is required to direct the liquid output of evaporator (1) either to vessel (3) or to the apparatus for spray-drying. In another embodiment, an additional vessel is used to collect the liquid output of evaporator (1) before spray-drying.

PREFERRED EMBODIMENTS

1. A set-up comprising evaporator (1) and mixing unit (2),
   wherein evaporator (1) has a feed inlet (1a), a vapor outlet (1b) and a liquid outlet (1c), and
   wherein mixing unit (2) has inlet (2a) and outlet (2b),
   characterized in that liquid outlet (1c) of evaporator (1), inlet (2a) of mixing unit (2), outlet (2b) of mixing unit (2) and feed inlet (1a) of evaporator (1) are connected to form a loop.

2. The set-up according to embodiment 1, characterized in that liquid outlet (1c) of evaporator (1) is connected to inlet (2a) of mixing unit (2), and characterized in that outlet (2b) of mixing unit (2) is connected to feed inlet (1a) of evaporator (1) such that a liquid composition can be pumped from mixing unit (2) into evaporator (1) and from evaporator (1) back into mixing unit (2).

3. The set-up according to embodiment 2, characterized in that the connection between liquid outlet (1c) of evaporator (1) and inlet (2a) of mixing unit comprises vessel (5), wherein said vessel (5) is preferably a holding vessel, and wherein vessel (5) is preferably provided with a pump to control the flow from vessel (5) into mixing unit (2), and/or
   characterized in that the connection between liquid outlet (1c) of evaporator (1) and inlet (2a) of mixing unit comprises valve (7a), wherein said valve (7a) is preferably a control valve.

4. The set-up according to any one of the preceding embodiments, further comprising vessel (3) and vessel (4),
   wherein vessel (3) and vessel (4) are arranged such that two non-identical compositions can be fed into the loop formed by liquid outlet (1c), inlet (2a), outlet (2b) and feed inlet (1a), and
   wherein vessel (3) and vessel (4) are preferably connected to mixing unit (2) such that mixing unit (2) can be fed through inlet (2a) with the composition of vessel (3), the composition of vessel (4) and the composition exiting liquid outlet (1c) of evaporator (1).

5. The set-up according to embodiment 4,
   wherein the set-up comprises means to control the flow from vessel (4) into mixing unit (2), and/or
   wherein the set-up preferably comprises means to control the flow from vessel (3) into mixing unit (2), and
   wherein vessel (3) and/or vessel (4) is preferably provided with a pump to control the flow into mixing unit (2).

6. The set-up according to any one of the preceding embodiments, further comprising vessel (6),
   wherein vessel (6) is arranged such that a fraction of the composition exiting liquid outlet (1*c*) of evaporator (1) can be diverted from said loop to vessel (6), and
   wherein the set-up preferably further comprises valve (7*b*) to control the amount of the composition exiting liquid outlet (1*c*) of evaporator (1) that is diverted to vessel (6), wherein said valve (7*b*) is preferably a control valve.
7. The set-up according to any one of the preceding embodiments, wherein vessel (3), vessel (4), vessel (5) and/or vessel (6) is capable of holding a volume of at least 100 liters, preferably of at least 500 liters and most preferably of at least 3000 liters.
8. The set-up according to any one of the preceding embodiments, wherein mixing unit (2) is a homogenizer device and wherein said homogenizer device is preferably a homogenizer with a pressure drop of at least 50 bar, a colloid mill, a nozzle, a rotor-stator or a combination thereof.
9. The set-up according to any one of the preceding embodiments, wherein evaporator (1) is suitable to remove an organic solvent and/or is a vertical evaporator, a film evaporator or a flash vessel.
10. The set-up according to any one of the preceding embodiments, further comprising an apparatus for spray-drying such as a spray-drying tower.
11. Use of the set-up according to any one of the preceding embodiments for encapsulating a fat-soluble compound, wherein said fat-soluble compound is preferably an edible colorant such as beta-carotene or lycopene.
12. Use according to embodiment 11, wherein an emulsifier is used to encapsulate said fat-soluble compound, and wherein the emulsifier is preferably a polymer, more preferably a colloid, and most preferably a hydrocolloid.

EXAMPLES

The present invention is further illustrated by the following examples. The examples are not meant to limit the invention in any way.

Example 1a

In Example 1a, the process concept shown in FIG. 4 is being used.

In a steered 2-liter vessel, 389 g modified food starch (commercially available HiCap®) is dissolved in 908 g water at 76° C. Thus, the 2-liter vessel contains approximately 1 liter of a liquid.

In a separate, steered 2-liter vessel, 83.6 g beta-carotene, 10.3 g dl-alpha tocopherol and 34.1 g corn oil are dispersed in 422.0 g ethyl acetate. The thus obtained dispersion is heated above the dissolution temperature to 121° C., resulting in a 15 weight-% beta-carotene solution. Thus, the 2-liter vessel contains approximately 0.5 liter of a liquid.

Instead of mixing the two compositions in one step, the process concept shown in FIG. 4 is followed. As a result, the emulsification mass ratio remained significantly below 30% at any time.

As mixing unit, an emulsification device is used. It is a rotor-stator followed by sapphire orifice (diameter 280 μm). The rotor speed of the rotor-stator was 5000 rpm, the pressure drop over the orifice of mixing unit was 75 bar, and the temperature was 85° C.

To remove the solvent, the output of mixing unit is fed into an evaporator through its feed inlet. Within the evaporator, the solvent and a minor part of the water is removed. In the present example, a fine film evaporator is used at 72° C. and 657 mbar.

The final dispersion has a beta-carotene content of 4.7 weight-%, based on the total weight of the dispersion. The dispersion's particles have an average particle size of 299 nm [mean size by cumulant, measured by Photo Correlation Spectroscopy (Beckman Coulter N4 Plus Submicron Particle Sizer)]. When spray-drying this composition, a powder comprising approx. 15.4 weight-% beta-carotene, based on the total weight of the powder, is expected to be obtained.

Example 1b (Comparative Example)

Example 1a is repeated. However, the process concept shown in FIG. 1 is applied.

In a steered 2-liter vessel, 389 g modified food starch is dissolved in 908 g water at 76° C. Thus, said 2-liter vessel contains approximately 1 liter of a liquid.

In a separate, steered 2-liter vessel, 83.6 g beta-carotene, 10.3 g dl-alpha tocopherol and 34.1 g corn oil are dispersed in 422 g ethyl acetate. The thus obtained dispersion is heated above dissolution temperature to 120° C., resulting in a 15 weight-% beta-carotene solution. Thus, the 2-liter vessel contains approximately 0.5 liter of a liquid.

As soon as the whole amount of the beta-carotene is dissolved, the lipophilic compounds are being added upstream of a mixing unit to the hydrophilic matrix phase.

As mixing unit, an emulsification device is used. The mixing unit is a rotor-stator followed by sapphire orifice (diameter 280 μm). The rotor speed of the rotor-stator was 5000 rpm, the pressure drop over the orifice of mixing unit was 76 bar, and the temperature was 86° C.

The output of mixing unit is an aqueous liquid which contains one type of particles only: The core of said particles comprises beta-carotene, corn oil and solvent (=ethyl acetate), i.e. the output of mixing unit contains ethyl acetate.

To remove the solvent, the output of mixing unit is then fed into an evaporator. Within the evaporator, the solvent and a minor part of the water is removed. In the present example, a fine film evaporator is used at 73° C. and 600 mbar.

The final dispersion ready to be spray-dried exits the liquid outlet of the evaporator and has a beta-carotene content of 3.3 weight-%, based on the total weight of the dispersion. The dispersion's particles have an average particle size of 593 nm [mean size by cumulant, measured by Photo Correlation Spectroscopy (Beckman Coulter N4 Plus Submicron Particle Sizer)].

Example 2 (Measurement of Filter Residue)

To check the quality of the final dispersion (i.e. of the dispersion ready to be spray-dried), the dispersion's amount of filter residue is determined by filtration. Low filter residue means good quality, i.e. suitable to be spray-dried.

The following method is used:

A sample of the dispersion to be tested is taken and the mass fraction of carotenoid ($w_s$) in the sample is determined by UV/Vis.

Approximately 500-1500 mg of the sample (sample ($m_s$) is taken and mass of carotenoid in sample ($m_s \times w_s$) is calculated. The sample is then suspended in 250 ml H₂O (60° C.), filtrated over a 2 g Hyflo Super Cel® (CAS 68855-54-9, crystalline silicic acid, bulk density: 300 kg/m³, available at Merck KGaA) on a filter paper (Whatman 1001-070, Grade 1, median pore size of 7.0 µm) and washed with 500 ml H₂O (60° C.). The aqueous liquid is waste, i.e. is discharged.

The filter residue is then washed down from the filter with approximately 100 ml acetone and 40 ml dichloromethane. Dichloromethane is an excellent solvent for carotenoids and thus, the obtained Residual-Solution (RS) contains the filter residue. The mass of carotenoid in the Residual-Solution ($m_{Caro.r}$) is then determined.

Then filter residue is calculated as follows:

$$FR = \frac{m_{Caro.r}}{m_{Caro.s}} \times 100$$

FR = Filtration Residue in %

$m_{Caro.r}$ = mass of Carotenoid in Residual-Solution (RS)

$m_{Caro.s}$ = mass of Carotenoid in sample ($m_s \times w_s$)

Any filtration residue below 4 weight-% of the total weight of the dispersion is ideal. A filtration residue of more than 10 weight-% of the total weight of the composition indicates the presence of not properly emulsified carotenoid.

The filtration residue of the dispersions of example 1a and of comparative example 1b have been measured. The results are shown in below Table 1.

TABLE 1

|  | example 1a | comparative example 1b |
|---|---|---|
| filtration residue | 1.4 weight-%, based on the total weight of the dispersion | 53.2 weight-%, based on the total weight of the dispersion |

Thus, using the process according to the invention has reduced filtration residue by approximately factor 35. This tremendous improvement is due to the compositions' emulsification mass ratio before evaporation. It example 1b, it is a lot higher (~30%) and probably above the system's critical emulsification mass ratio.

Examples 3a and 3b (Replacement of Modified Starch)

Examples 1a and 1b were repeated. This time, however, a different kind of modified starch (Capsul® instead of HiCap®) was used. Furthermore, no oil was used. A comparison of the compositions used in examples 1a/1b and in examples 3a/3b is shown in below Table 2.

TABLE 2

|  | examples 1a/1b | examples 3a/3b |
|---|---|---|
| composition in vessel (3) at the beginning of the process | beta-carotene dl-alpha tocopherol corn oil ethyl acetate HiCap ® | beta-carotene dl-alpha tocopherol — ethyl acetate Capsul ® |
| composition in vessel (4) at the beginning of the process | Water | Glucidex ® (Glucose Sirup) Sodium ascorbate Water |

In example 3a, the process of the invention was used. In example 3b (=comparative example), the process of the prior art was used.

The filtration residue of the dispersions of example 3a and of comparative example 3b have been measured as explained in example 2. The results are indicated in below Table 3.

TABLE 3

|  | example 3a | comparative example 3b |
|---|---|---|
| filtration residue | 3.9 weight-%, based on the total weight of the dispersion | 54.9 weight-%, based on the total weight of the dispersion |

The final dispersion obtained in example 3a has a beta-carotene content of 4.1 weight-%, based on the total weight of the dispersion. The dispersion's particles have an average particle size of 171 nm [mean size by cumulant, measured by Photo Correlation Spectroscopy (Beckman Coulter N4 Plus Submicron Particle Sizer)]. When spray-drying this composition, a powder comprising approx. 10.7 weight-% beta-carotene, based on the total weight of the powder, is expected to be obtained.

Examples 3a and 3b confirm that filtration residue can be reduced when using the process of the invention.

Examples 4a and 4b (Lycopene)

Examples 1a and 1b were repeated. This time, however, a different kind of fat-soluble compound (lycopene instead of beta-carotene) was used. Furthermore, no oil was used. A comparison of the compositions used in examples 1a/1b and in examples 4a/4b is shown in below Table 4.

TABLE 4

|  | examples 1a/1b | examples 4a/4b |
|---|---|---|
| composition in vessel (3) at the beginning of the process | beta-carotene dl-alpha tocopherol corn oil ethyl acetate HiCap ® | lycopene dl-alpha tocopherol — ethyl acetate Capsul ® |
| composition in vessel (4) at the beginning of the process | Water | Glucidex ® (Glucose Sirup) Sodium ascorbate Water |

In example 4a, the process of the invention was used. In example 4b (=comparative example), the process of the prior art was used.

The filtration residue of the dispersions of example 4a and of comparative example 4b has been measured as explained in example 2. The results are shown in below Table 5.

TABLE 5

|  | example 4a | comparative example 4b |
|---|---|---|
| filtration residue | 3.6 weight-%, based on the total weight of the dispersion | 43.8 weight-%, based on the total weight of the dispersion |

Thus, examples 4a and 4b confirm that filtration residue can be reduced when using the process of the invention.

Examples 5a and 5b (Isopropyl Acetate)

Examples 1a and 1b were repeated. This time, however, a different kind of solvent (isopropyl acetate instead of ethyl acetate) was used. A comparison of the compositions used in examples 1a/1b and in examples 5a/5b is shown in below Table 6.

TABLE 6

|  | examples 1a/1b | examples 5a/5b |
|---|---|---|
| composition in vessel (3) at the beginning of the process | beta-carotene dl-alpha tocopherol corn oil ethyl acetate | beta-carotene dl-alpha tocopherol corn oil isopropyl acetate |
| composition in vessel (4) at the beginning of the process | HiCap ® Water | HiCap ® Water |

In example 5a, the process of the invention was used. In example 5b (=comparative example), the process of the prior art was used.

The filtration residue of the dispersions of example 5a and of comparative example 5b have been measured as explained in example 2. The results are indicated in below Table 7.

TABLE 7

|  | example 5a | comparative example 5b |
|---|---|---|
| filtration residue | 2.1 weight-%, based on the total weight of the dispersion | 35.9 weight-%, based on the total weight of the dispersion |

Thus, examples 5a and 5b confirm that filtration residue can be reduced when using the process of the invention.

Furthermore, the beta-carotene content of the dispersion of example 5a has been determined by UV/VIS. A content of 7.3 weight-%, based on the total weight of the dispersion, was measured. If such a dispersion is spray-dried, the obtained powder is expected to have a beta-carotene content of approx. 24.0 weight-%, based on the total weight of the powder.

Examples 6a and 6b (Gelatin)

Examples 1a and 1b were repeated. This time, however, a different kind of emulsifier/colloid (gelatin instead of modified starch) was used. A comparison of the compositions used in examples 1a/1b and in examples 6a/6b is shown in below Table 8.

TABLE 8

|  | examples 1a/1b | examples 6a/6b |
|---|---|---|
| composition in vessel (3) at the beginning of the process | beta-carotene dl-alpha tocopherol corn oil ethyl acetate | beta-carotene dl-alpha tocopherol corn oil ethyl acetate |
| composition in vessel (4) at the beginning of the process | HiCap ® Water | Fish gelatin (dried) sucrose ascorbyl palmitate water |

In example 6a, the process of the invention was used. In example 6b (=comparative example), the process of the prior art was used.

The filtration residue of the dispersions of example 6a and of comparative example 6b have been measured as explained in example 2. The results are indicated in below Table 9.

TABLE 9

|  | example 6a | comparative example 6b |
|---|---|---|
| filtration residue | 1.6 weight-%, based on the total weight of the dispersion | 79.9 weight-%, based on the total weight of the dispersion |

Thus, examples 6a and 6b confirm that filtration residue can be reduced when using the process of the invention.

Furthermore, the beta-carotene content of the dispersion of example 6a has been determined by UV/VIS. A content of 14.9 weight-%, based on the total weight of the dispersion, was measured. If such a dispersion is spray-dried, the obtained powder is expected to have a beta-carotene content of approx. 37.1 weight-%, based on the total weight of the powder.

Example 6 clearly shows that the technical effects of the invention are particularly evident if highly concentrated powders are to be manufactured.

The invention claimed is:

1. A process for producing a dispersion of spray-dryable particles which encapsulate at least one fat-soluble compound, wherein the process comprises:
   (a) providing a composition that comprises water and first and second types of particles dispersed in the water, wherein each of the first and second types of particles includes:
      (i) a core which comprises at least one fat-soluble compound and at least one solvent, and
      (ii) a shell surrounding the core which comprises at least one emulsifier, and wherein
   the process further comprises:
   (b) removing the at least one solvent at least partially from the core of the first and second types of particles of the composition provided by step (a) to thereby form the dispersion of spray-dryable particles which encapsulate the at least one fat-soluble compound within the core by the shell surrounding the core, and wherein
   the first and second types of particles in the composition provided by step (a) have respectively different amounts of the at least one solvent in the core such that the amount of solvent molecules of the at least one solvent in the core of the first type of particles is greater than the amount of solvent molecules of the at least one solvent in the core of the second type of particles so as to thereby establish a bimodal particle solvent distribution of the first and second types of particles.

2. The process according to claim 1, wherein step (b) comprises removing the at least one solvent from the core of each of the first and second types of particles by a vertical evaporator, a film evaporator or a flash vessel.

3. The process according to claim 1, wherein the at least one solvent has a boiling point of less than 120° C. at 1013.25 hPa.

4. The process according to any one of claim 1, wherein the at least one solvent is at least one water immiscible organic solvent selected from the group consisting of dichloromethane, ethyl acetate and isopropyl acetate.

5. The process according to claim 1, wherein step (b) is practiced by heating the composition at a pressure of less than 1500 mbar.

6. The process according to claim 1, wherein the at least one solvent has a boiling point of less than 100° C. at 1013.25 hPa.

7. The process according to claim 1, wherein the at least one fat-soluble compound comprises carotenoids, retinoids or natural colorants.

8. The process according to claim 7, wherein the at least one fat-soluble compound comprises beta-carotene, lycopene, beta-apo-4'-carotenal, beta-apo-8'-carotenal, beta-apo-12'-carotenal, beta-apo-8'-carotenic acid, astaxanthin, canthaxanthin, zeaxanthin cryptoxanthin, citranaxanthin, lutein, torularodin-aldehyde, torularodin-ethylester, neurosporaxanthin-ethylester, zeta-carotene, dehydroplectaniaxanthin, bixin, saffron, crocin, capsanthin, capsorubin, rubixanthin, violaxanthin, rhodoxanthin, a metal chelate of carminic acid, curcumin, or chlorophyllin.

9. The process according to claim 7, wherein the at least one fat-soluble compound comprises beta-carotene or lycopene.

10. The process according to claim 1, wherein the at least one emulsifier comprises modified starch or gelatin.

11. The process according to claim 10, wherein the at least one emulsifier comprises octenyl-succinate (OSA) starch, xanthan gum, gum arabic, guar gum, locust bean gum, carboxymethyl cellulose, or alginate.

12. The process according to claim 1, wherein the shell comprises at least one modified starch and/or or at least one gelatin.

13. The process according to claim 1, wherein the core comprises at least one colorant, the at least one solvent and optionally at least one edible oil.

14. The process according to claim 13, wherein the at least one colorant comprises beta-carotene or lycopene.

15. The process according to claim 13, wherein the at least one solvent comprises ethyl acetate or isopropyl acetate.

16. The process according to claim 13, wherein the at least one edible oil is present and further comprises a vegetable oil.

17. The process according to claim 1, wherein step (b) comprises removing the at least one solvent from the core to form a dispersion of the spray-dryable particles in the water.

18. The process according to claim 17, wherein the dispersion comprises a filter residue of less than 30 wt. %, based on a total weight of the dispersion.

19. The process according to claim 1, wherein the core of each of the first type of particles includes at least 5% of the solvent molecules of the at least one solvent, based on the total number of molecules in the core of the first type of particles.

20. The process of claim 19, wherein the core of each of the second type of particles includes less than 10,000 ppm of the solvent molecules of the at least one solvent, based on the total number of molecules in the core of the second type of particles.

21. The process of claim 19, wherein the core of each of the second type of particles includes less than 100 ppm of the solvent molecules of the at least one solvent, based on the total number of molecules in the core of the second type of particles.

22. The process of claim 19, wherein the core of each of the second type of particles includes less than 10 ppm of the solvent molecules of the at least one solvent, based on the total number of molecules in the core of the second type of particles.

23. The process according to claim 1, wherein the core of each of the first type of particles includes at least 40% of the solvent molecules of the at least one solvent, based on the total number of molecules in the core of the first type of particles.

24. The process according to claim 1, wherein the core of each of the first type of particles includes at least 85% of the solvent molecules of the at least one solvent, based on the total number of molecules in the core of the first type of particles.

25. A process for forming a spray-dried powder which comprises:
(i) forming the dispersion of spray-dryable particles according to claim 1, and
(ii) converting the dispersion of spray-dryable particles into a spray-dried powder thereof.

26. The process according to claim 25, wherein step (ii) comprises spray-drying the dispersion off spray-dryable particles to create the spray-dried powder thereof.

27. The process according to claim 26, wherein the spray-dried powder comprises beta-carotene, at least one edible oil and at least one modified starch, and wherein said spray-dried powder comprises at least 20 weight-% beta-carotene, based on the total weight of the spray-dried powder.

* * * * *